US005156384A

United States Patent [19] | [11] Patent Number: 5,156,384
Donahue | [45] Date of Patent: Oct. 20, 1992

[54] COLLECT TAB STACKING METHOD WITH TRANSVERSE CUTTING STAGE FORMING INSERTS AND INDEXING INSERTS

[75] Inventor: Pat Donahue, Belle Mead, N.J.

[73] Assignee: Webcraft Technologies, Inc., North Brunswick, N.J.

[21] Appl. No.: 786,466

[22] Filed: Nov. 4, 1991

[51] Int. Cl.[5] .................... B65H 33/04; B65G 57/00

[52] U.S. Cl. .................... 270/95; 83/343; 414/789.5

[58] Field of Search .................... 270/95, 59; 414/789.5; 83/331, 343, 673, 674; 53/520

[56] References Cited

U.S. PATENT DOCUMENTS

| | | | |
|---|---|---|---|
| 435,355 | 8/1890 | Cox | 83/344 X |
| 1,321,468 | 11/1919 | McAdams | 270/95 X |
| 1,450,427 | 4/1923 | Cannard et al. | 270/95 X |
| 1,611,476 | 12/1926 | Maxson | 270/95 |
| 4,939,888 | 7/1990 | Katz et al. | 53/435 X |
| 4,949,615 | 8/1990 | Jordan | 83/343 X |
| 5,024,128 | 6/1991 | Campbell, Jr. | 83/343 X |

*Primary Examiner*—Edward K. Look
*Assistant Examiner*—John Ryznic
*Attorney, Agent, or Firm*—Shlesinger Arkwright & Garvey

[57] ABSTRACT

The method for producing indexable sets of inserts by printing a web in a repeating mode to form successive groups of printed areas, each group of printed areas corresponding to a particular set of inserts, imaging personalized information on at least one printed area of each group, longitudinally severing the webs into ribbons, superposing the ribbons one above another, transversely severing the superposed ribbons forming successively severed inserts, at least one of which serves as an indexing insert having a greater length than the remaining inserts in a particular set of inserts.

18 Claims, 2 Drawing Sheets

FIG. 1
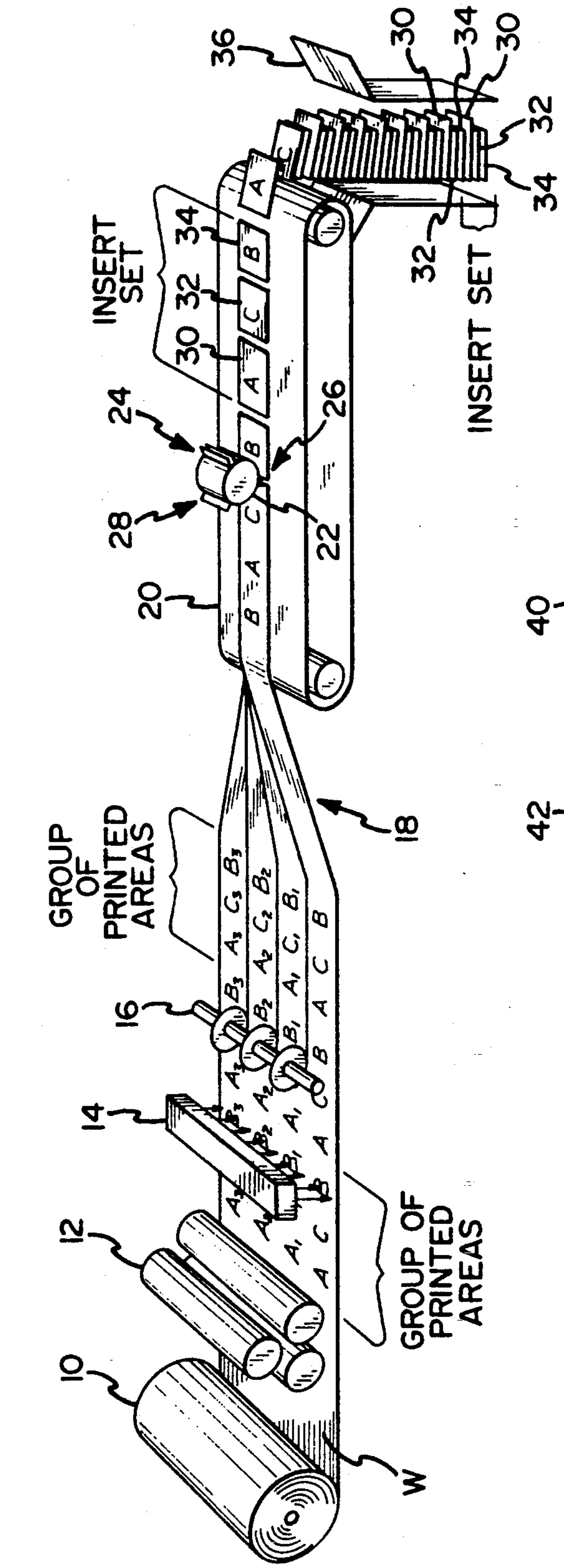
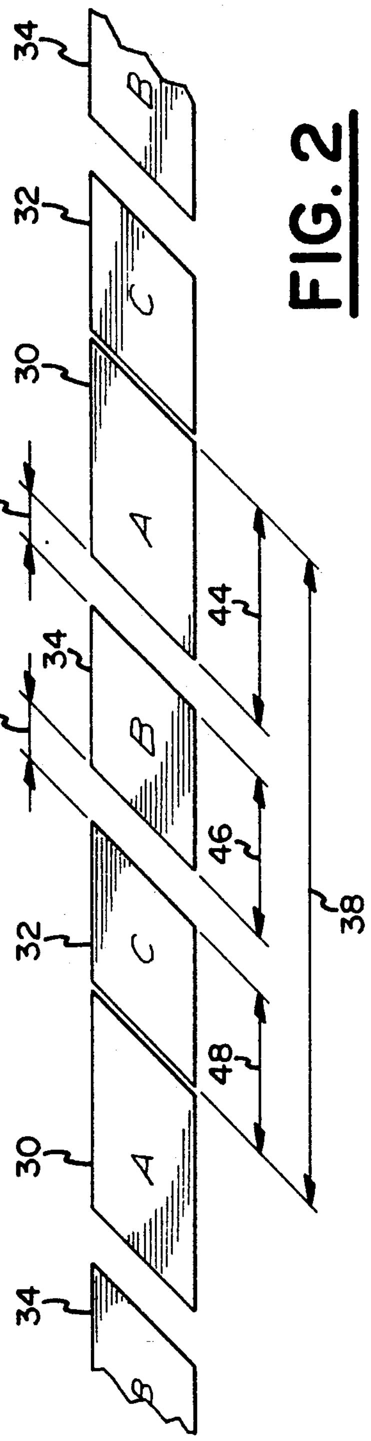
FIG. 2

COLLECT TAB STACKING METHOD WITH TRANSVERSE CUTTING STAGE FORMING INSERTS AND INDEXING INSERTS

FIELD OF THE INVENTION

This invention relates to a method for in-line production of mass distributable sets of personalized paper inserts and more particularly to a method for producing sets of inserts having indexing means allowing machine separation and collection of individual sets from a stack thereof.

BACKGROUND OF THE INVENTION

Mass distributed advertising pieces have been increasingly used by advertisers to sell their products. The distribution of these pieces, whether by mail or by insertion into newspapers or magazines, has become an effective advertising practice.

In many mailings, the advertising material is personalized by adding the name of the person who is to receive the material. For example, mailings to members of associations, or other groups such as credit card holders, or selected types of customer groups, have included personalized solicitational letters. Often, one or more other types of pieces, such as two page advertising inserts, or an order blank, or return envelope, are also included in the mailing.

These additional pieces have increased the effectiveness of the promotion. The additional pieces, although adding versatility to the advertiser promotion, frequently require additional manufacturing steps which can add significantly to the cost of producing the advertising item.

U.S. Pat. No. 4,939,888 to Katz et al. marked an advancement in the marketing industry by providing an in-line method for producing a mass distributable packet comprised of personalized inserts, such as redemption coupons for a relatively low unit cost.

Katz et al. teaches printing on a web, a format of successive rectangular pieces in a plurality of side by side lines extending parallel to the web edges, wherein the pieces are part of a common print repeat or a submultiple thereof. After printing, the web is severed along the longitudinal lines to provide individual longitudinally extending ribbons containing successive printed pieces. The ribbons are then superposed and transversely cut to produce sets of pieces, for example, coupons and the like, to be packaged for mass distribution.

In order to allow individual sets of coupons to be taken from a stack of such sets, Katz et al. provides individually inserted separators between adjacent sets, the separators being sized so that they extend beyond the set edge. Alternatively, a separate cutter is added into the production assembly in order to cut notches along one longitudinal edge of the web at spaced intervals, thereby providing selected inserts with projecting indexing edges. When the indexed sets are stacked, individual sets may be removed in succession by engagement of the projecting edge portions by a modified sheet separating machine.

Either method of providing separators requires additional machinery adding to the overall complexity and expense of the assembly.

SUMMARY OF THE INVENTION

This invention is directed to an in-line method for preparing personalized mass distributable insert sets containing multiple insert items of the same or different format, as well as to a method for indexing the insert sets so that they may be readily removed from a stack of such sets by a separating machine.

The inserts may be of coupon, letter, booklet or other format, as well as combinations of the above. In addition, one or more items of the insert set may be personalized, such as by being imaged with the name or other identifying information specific to the individual intended to receive such material.

The present invention provides an in-line production method eliminating errors associated with the prior art methods of collating multiple piece insert sets, particularly, eliminating handling errors resulting in the loss of individual insert items from the sets prior to distribution to the intended recipients.

The invention further provides a method for a single line printing in fabrication of a varied group of inserts in a set, eliminating the need to produce each different type of insert on a different product line, and then to subsequently group and collate them in an assembly operation, consequently eliminating the handling errors incident to the assembling of different types of pieces. This is of particular importance where the inserts themselves are each personalized with an individuals name and address. Further, the use of only a single production line brings about an efficiency by reason of eliminating other individual lines that ordinarily previously were required for the making of such sets.

The present invention utilizes some of the methodology taught by Katz et al., while expanding thereupon to provide an improved system having greater versatility.

The invention provides a method for printing a web in a repeating mode to form successive groups of printed areas, each group of printed areas ultimately corresponding to the inserts of a particular set of inserts. Personalized information is imaged on one or more printed areas of each group. The web is then longitudinally severed into longitudinally extending ribbons. Next, the ribbons are superposed one above another so that the printed areas of the ribbons are in registry with each other. Following superimposition, the ribbons are transversely severed in a manner which results in the formation of an indexing insert for each set, having a length greater than that of the remaining inserts in a given set. The inserts are finally collected into sets and stacked one above the other with the indexing inserts located between adjacent sets, thereby providing machine engageable edges extending laterally beyond the remaining insert edges in each set.

The transverse severing step performs two functions, namely, it functions to successively separate individual inserts from the superposed ribbons. Secondly, it functions to cut an indexing insert for each insert set having a greater length than the remaining inserts of that set.

DESCRIPTION OF THE DRAWINGS

FIG. 1 is a schematic illustration of a method for manufacturing a stack of personalized indexed insert sets;

FIG. 2 is a fragmentary enlarged perspective view of the severed inserts of FIG. 1;

DETAILED DESCRIPTION OF THE INVENTION

Figure 3:
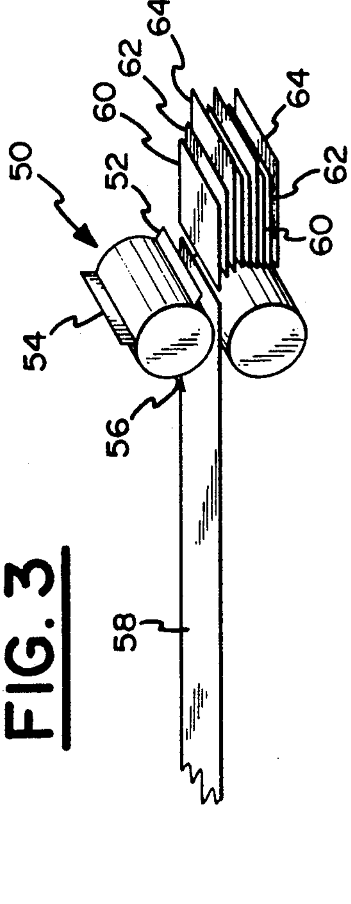
FIG. 3 is a fragmentary schematic view of an alternative method for cutting inserts.

Referring to FIG. 1 of the drawings, a roll of web stock 10 supplies a web W of paper sheet stock to a high speed press 12 which prints the web with successive groups of printed areas. The printed areas of each group are represented by the letters A, $A_1$, $A_2$, $A_3$, C, $C_1$, $C_2$, $C_3$, B, $B_1$, $B_2$ and $B_3$.

The printed areas of a particular group may be of the same printed format or different printed formats. For example, selected printed areas may correspond to printed coupons, printed pages of letters, printed application forms and the like. The printed areas will ultimately become a set of inserts for mass distribution. A set of inserts will contain all of the printed areas in a particular group. Each group of printed areas are printed as a unit simultaneously in a print roll repeat or a submultiple thereof.

After printing by press 12, the printed areas pass under a jet imaging printing bar 14 which prints personalized information on one or more printed areas of each groups. The personalized information may be the name of the intended recipient, a recipient identification number, or any other printed information specific to the intended recipient. The printed areas in each succeeding group receive their own personalized information.

Next, the printed and personalized web is passed to a rotary cutter assembly 16 which longitudinally severs the web into multiple ribbons which are subsequently superposed one above another as indicated at 18. The superposed ribbons are transported by conveyor 20 to cutter 22. For the sake of clarity, the superposed ribbons are depicted as a single ribbon on conveyor 20. It is to be understood that during superpositioning, the printed areas of each ribbon have been aligned to coincide with the printed areas of each underlying ribbon. Thus, printed areas $A_1$, $A_2$, and $A_3$ are aligned beneath printed area A on conveyor 20, printed areas $B_1$, $B_2$ and $B_3$ are aligned beneath printed area B, and so forth.

Rotary cutter 22 includes dual cutting blades 24, dual cutting blades 26 and single cutting blade 28. A spacing exists between the two blades 24 which allows a chip to be removed from the superposed ribbons between printed areas B and A. Likewise, a spacing exists between the two blades 26 allowing a chip to be removed from between printed areas C and B. The single blade 28 does not remove a chip but rather produces a slice between printed areas A and C. The end result of this arrangement is the production of sets of inserts, each set consisting of an indexing insert 30 of greater lengths than inserts 32 and 34. Additional insert sets are collected as a stack in receiver 36. When stacked, indexing inserts 30 extend outwardly from the remaining inserts 32 and 34 and provide edges which may be engaged by a separating machine (not shown). A complete description of a suitable separating machine is set forth in U.S. Pat. No. 4,939,888 to Katz et al., which is incorporated herein by reference. The separating machine will engage an indexing insert 30 to separate a first set of inserts 30, 32 and 34 from a second overlying set of inserts in the stack. The complete set of inserts is removed from the stack of insert sets for subsequent packaging prior to mass distribution with like packaged sets. Additional details of the packaging procedure are set forth in U.S. Pat. No. 4,939,888, incorporated herein by reference. For the sake of clarity, each set of inserts stacked in receiver 36 consists of an indexing insert 30 as well as inserts 32 and 34. In actuality, due to the superpositioning of the ribbons, each insert 30 includes equally sized superposed inserts containing printed areas A, $A_1$, $A_2$, and $A_3$, respectively.

Likewise, each insert 32 includes equally sized superposed inserts containing printed areas C, $C_1$, $C_2$ and $C_3$, respectively. Insert 34 includes equally sized superposed inserts containing printed areas B, $B_1$, $B_2$, and $B_3$, respectively.

FIG. 2 depicts the spacing between successively cut inserts 30, 32 and 34 after severing by rotary cutter 22 of FIG. 1. Distance 38 represents the circumference of cutter 22. Distance 40 represents the spacing between the two cutting blades 24. Distance 42 represents the spacing between the two cutting blades 26.

If the blade spacing of cutting blades 24 is equal to the blade spacing of cutting blades 26, distance 40 and 42 are equal and represent the width of a removed superposed ribbon chip. If the distance between dual cutting blades 24 and single cutting blade 28 is equal to one third of the circumference of rotary cutter 22, distance 44 representing the length of indexing insert 30, is likewise one third of the circumference of cutter 22. If the distance between dual cutting blades 24 and dual cutting blades 26 is equal to the distance between dual cutting blades 26 and single cutting blade 28, the length of insert 34, namely, distance 46, is equal to the length of insert 32, or distance 48. Thus, each distance 46 and 48 is equal to one third of the circumference of rotary cutter 22 minus a ribbon chip width.

FIG. 3 depicts an alternative method of indexing sets of inserts using a rotary cutter 50 having single cutting blades 52, 54 and 56. The distance between blade 52 and blade 54 is equal to the distance between blade 54 and blade 56, which is less than the distance between blade 52 and blade 56. Superposed ribbon 58, having aligned printed areas such as those depicted in conjunction with FIG. 1, are passed through rotary cutter 50 to produce successive, indexed insert sets. Each insert set includes equal length inserts 60 and 62 as well as an indexing insert 64 of greater length than inserts 60 and 62.

Figure 5:
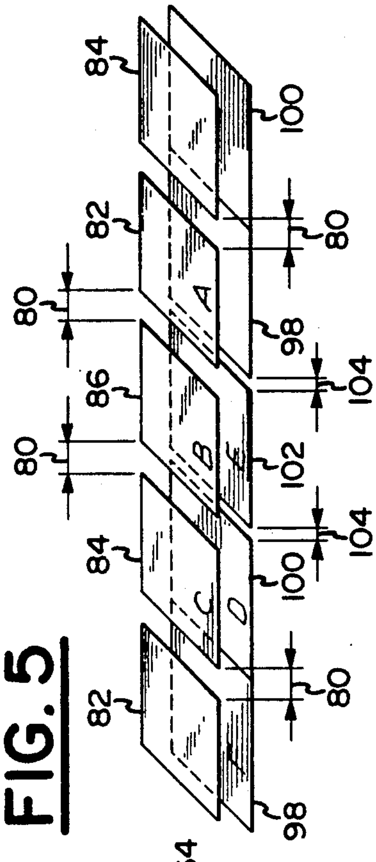
FIG. 5 is an enlarged schematic perspective view showing the severed inserts of FIG. 4; and, FIG. 6 is a schematic side view of the stack of inserts of FIG. 4.
Figure 4:
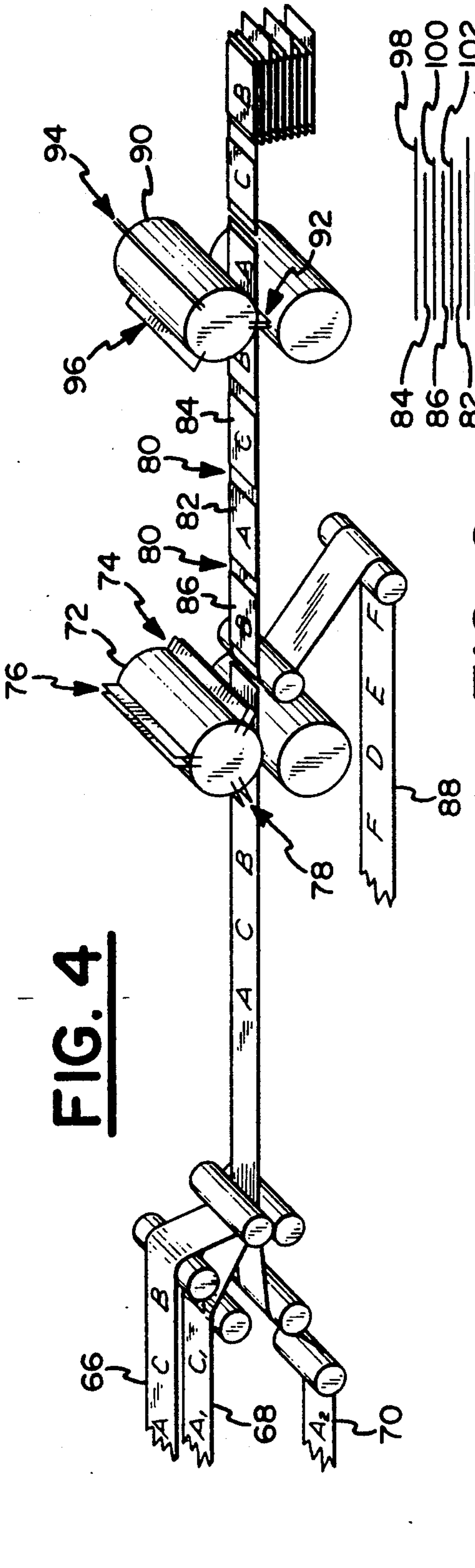
FIG. 4 is a fragmentary schematic view of a dual cutting method for producing indexed insert sets.

In FIG. 4, a plurality of ribbons 66, 68 and 70, each having a repeating pattern of printed areas A, C, B, similar to the repeating pattern of FIG. 1, are superposed one upon another and passed through a first rotary cutter 72. Rotary cutter 72 includes blade pairs 74, 76 and 78. Blade pairs 74, 76, and 78 are equally spaced about the periphery of rotary cutter 72. In addition, the individual blades of each pair are equally spaced apart. Rotary cutter 72 cuts equally spaced chips 80 from between successive printed areas of the superposed ribbons, thereby forming equal length severed inserts 82, 84 and 86, as best shown in FIG. 5.

A second printed ribbon 88 is provided which may be a single printed ribbon or a group of superposed printed ribbons similar to ribbons 66, 68 and 70. Ribbon 88 is printed with a repeating format of printed areas F, D, and E and is positioned in underlying relation with the previously severed inserts. When properly aligned, printed areas A and F, C and D, and B and E are in registry with one another as shown in FIG. 5. Next, the aligned assembly is passed through a second rotary cutter 90 having dual cutting blades 92, dual cutting blades 94 and single cutting blade 96 spaced about the periphery thereof. Rotary cutter 90 is identical in construction to rotary cutter 22 of FIG. 1. Each of the dual blades 92 and 94 as well as the single blade 96 pass through previously formed notches 80 between the upper inserts 82, 84 and 86 to sever the lower ribbon, thereby producing additional severed inserts 98, 100 and 102.

The spacing between the individual blades of 94 is equal to the spacing between blades 92. These spacings correspond to the size of notches 104 cut between inserts 100 and 102 and between inserts 102 and 98. In addition, the blade spacing of the individual blades of each dual blade pair 92 and 94 is less than the blade spacing of the individual blades of each blade pair 74, 76 and 78. Thus, notches 104 are of a smaller size than notches 80, as shown in FIG. 5. The provision of a single cutter blade 96 on rotary cutter 90 allows a sever line instead of a notch to be formed between inserts 98 and 100. This arrangement of dual notches in combination with a single sever line results in the formation of indexing inserts 98 having a greater length than the remaining inserts for a given set of inserts, namely, inserts 84, 100, 86, 102 and 82. After passing through the second cutter 90, the inserts are stacked, for example, in a receiver (not shown).

Figure 6:
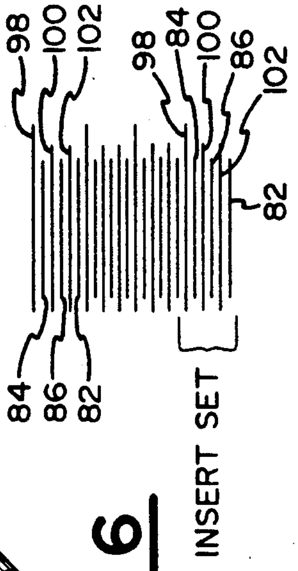

FIG. 6 shows the stacking configuration of plural sets of inserts. The sets are separated by longer indexing inserts 98.

While not shown in the drawings, any of the individual ribbons, such as ribbons 66, 68, 70 or 88 of FIG. 4, or the individual ribbons of FIG. 1, may themselves be formed from any number of superposed printed ribbons. In addition, the number of ribbons severed from a web of material may vary in number from the shown embodiments. Furthermore, any individual ribbon depicted in the drawings may actually be a folded ribbon, that is, a ribbon having one or more fold lines extending in the longitudinal direction thereof. For example, ribbon 88 of FIG. 4, may actually be formed as a wider ribbon than shown and folded in the longitudinal direction one or more times. These ribbons are particularly useful in forming folded advertisements, folded application forms and other similar pieces of personalized folded inserts.

Ribbon 88 may be severed from the same web of material as ribbons 66, 68 and 70, or provided from a separate web.

As a further embodiment, some of the inserts may be formed as booklets. This would require the addition of a glue application step, wherein multiple printed pages would be glued together, for example, along a common edge.

The printed personalized insert sets may contain items of a single format or a combination of formats. For example, the present invention lends itself to the preparation of personalized insert sets containing combinations of printed coupons, multi-page printed letters, printed and folded application forms, printed and folded letters, printed booklets, etc.

While this invention has been described as having a preferred design, it is understood that it is capable of further modifications, uses and/or adaptations of the invention and following in general the principle of the invention and including such departures from the present disclosure as come within the known or customary practice in the art to which the invention pertains, and as may be applied to the essential features set forth, and fall within the scope of the invention or the limits of the appended claims.

I claim:

1. A method for producing indexable sets of inserts including the steps of:

a) printing a web in a repeating mode to form successive groups of printed areas, each group of printed areas corresponding to a particular set of inserts;
b) imaging personalized information on at least one printed area of each group;
c) longitudinally severing the web into ribbons;
d) superposing the ribbons one above another,
e) transversely severing the superposed ribbons forming successively severed inserts, at least one of which serves as an indexing insert having a greater length than the remaining inserts in a particular set of inserts, and
f) collecting the inserts as complete indexable sets.

2. A method for producing indexable sets of inserts as in claim 1, including the step of:

a) transversely severing the superposed ribbons by removing a width of ribbon material from between selected adjacent inserts of a particular set of inserts.

3. A method for producing indexable sets of inserts as in claim 2, including the step of:

a) removing a width of ribbon material from between all but a single pair of adjacent inserts for a particular set of inserts.

4. A method for producing indexable sets of inserts as in claim 1, including the step of:

a) transversely severing the superposed ribbons at irregular intervals.

5. A method for producing indexable sets of inserts as in claim 1, including the step of:

a) printing a web in a repeating mode to form successive groups of printed areas, the printed areas of a particular group having a common printing format.

6. A method for producing indexable sets of inserts as in claim 1, including the step of:

a) printing a web in a repeating mode to form successive groups of printed areas, the printed areas of a particular group having at least two different printing formats.

7. A method for producing indexable sets of inserts as in claim 1, including the step of:

a) longitudinally severing the web into ribbons of a generally common width.

8. A method for producing indexable sets of inserts as in claim 1, including the steps of:

a) longitudinally severing the web into ribbons, at least one of which is of a width substantially greater than the width of the remaining ribbons; and
b) folding the greater width ribbon to provide at least one fold line extending in the longitudinal direction of the ribbon.

9. A method for producing indexable sets of inserts as in claim 1, including the step of:

a) collecting the inserts by stacking.

10. A method for producing indexable sets of inserts as in claim 1, including the steps of:

a) transversely severing the superposed ribbons forming spaced apart successively severed inserts of substantially equal length;
b) providing at least one additional printed ribbon;

c) positioning the additional ribbon beneath the spaced apart severed inserts;

d) transversely severing the additional ribbon into additional inserts, at least one of which serves as an indexing insert having a greater length than the remaining inserts for a particular set of inserts; and e) collecting the inserts as indexable sets of inserts.

11. A method for producing indexable sets of inserts as in claim 10, including the steps of:

a) transversely severing the superposed ribbons by removing widths of material from between each successive adjacent insert; and b) transversely severing the additional ribbon by removing widths of material from between selected successive additional inserts.

12. A method for producing indexable sets of inserts as in claim 10, including the step of:

a) providing at least one additional printed ribbon having at least one fold line extending longitudinally thereof.

13. A method for producing indexable sets of inserts as in claim 10, including the step of:

a) providing at least two superposed additional printed ribbons.

14. A method for producing indexable sets of inserts as in claim 10, including the step of:

a) providing at least one additional printed ribbon longitudinally severed from the original web of material.

15. A method for producing indexable sets of inserts including the steps of:

a) printing a web in a repeating mode to form successive groups of printed areas, each group of printed areas corresponding to a particular set of inserts;

b) imaging personalized information on at least one of the printed areas of each group;

c) longitudinally severing the web into ribbons;

d) superposing the ribbons one above another;

e) transversely severing the superposed ribbons forming successively severed inserts, at least one of which serves as a machine-engageable indexing insert having a greater length than the remaining inserts in a given set of inserts; and, f) collecting the inserts by forming a stack of successive individual sets separated by indexing inserts.

16. An apparatus for producing indexable sets of inserts comprising:

a) printing means for printing a web in a repeating mode to form successive groups of printed areas, each group of said printed areas corresponding to a particular set of inserts;

b) imaging means for imaging personalized information on at least one of said printed areas of each of said groups;

c) first severing means for longitudinally severing said web into ribbons;

d) ribbon superposing means for superposing said ribbons one above another;

e) second severing means for transversely severing said superposed ribbons forming successively severed inserts, at least one of which serves as an indexing insert having a length greater than the length of the remaining inserts for a given set of inserts; and, f) collection means for collecting said inserts as complete indexable sets.

17. An apparatus for producing indexable sets of inserts as in claim 16, wherein:

a) said second severing means is a rotary cutter including a single cutting blade for slicing said superposed ribbons and a pair of dual cutting blades for removing chips of material from said ribbons, said single and dual cutting blades being spaced at intervals about the periphery of said rotary cutter.

18. An apparatus for producing indexable sets of inserts as in claim 16, wherein:

a) said second severing means includes a rotary cutter having irregularly spaced single cutting blades about the periphery thereof.

* * * * *